Jan. 19, 1926.  1,570,134
J. F. DIEMER
INSECT CONTAINER
Filed Oct. 5, 1925
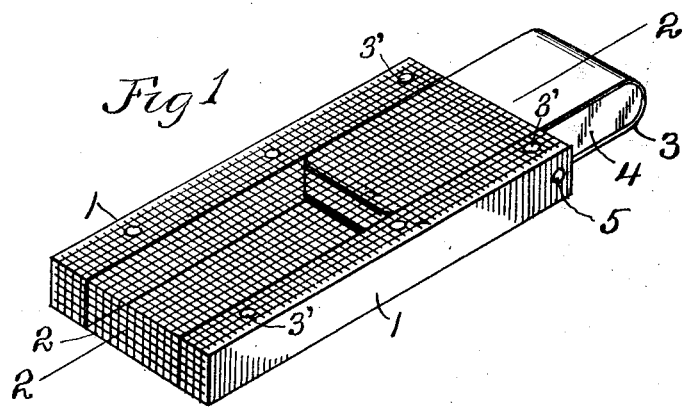
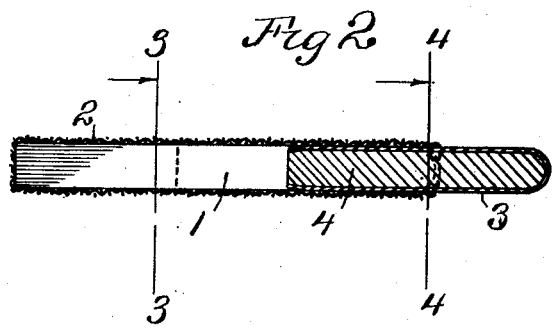
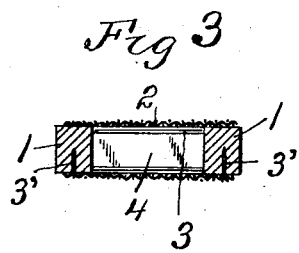  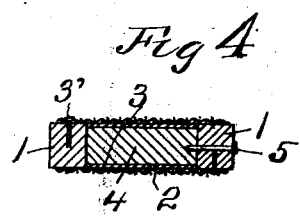
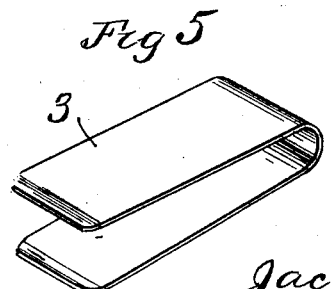
INVENTOR.
Jacob F. Diemer
BY Warren D. House
His ATTORNEY.
Witness:
R. E. Hamilton Patented Jan. 19, 1926.

1,570,134

UNITED STATES PATENT OFFICE.

JACOB F. DIEMER, OF LIBERTY, MISSOURI.

INSECT CONTAINER.

Application filed October 5, 1925. Serial No. 60,486.

*To all whom it may concern:*

Be it known that I, JACOB F. DIEMER, a citizen of Liberty, in the county of Clay and State of Missouri, have invented a certain new and useful Improvement in Insect Containers, of which the following is a specification.

My invention relates to improvements in insect containers.

One of the objects of my invention is to provide a novel container adapted for the shipping and housing of insects, such as queen bees, and for feeding them in transit and until released. It provides further novel means for holding food for the insect in the container in a manner such that the insect in the container by itself, or with the assistance of the insects at the exterior of the container, frees itself from the container.

A further object of my invention is to provide a container of the kind described, which is simple, cheap, durable, is of sufficient strength, can be repeatedly used, and which is efficient.

The novel features of my invention are hereinafter fully described and claimed.

In the accompanying drawing, which illustrates the preferred embodiment of my invention, Fig. 1 is a perspective view of my improved insect container, the food receptacle being shown filled with food and partly open.

Fig. 2 is a longitudinal section on the line 2—2 of Fig. 1.

Fig. 3 is a section on the line 3—3 of Fig. 2.

Fig. 4 is a section on the line 4—4 of Fig. 2.

Fig. 5 is a perspective view of the food receptacle shown empty and detached from the casing.

Similar reference characters designate similar parts in the different views.

The casing comprises two parallel longitudinal, preferably wooden, members 1, the opposite sides and one set of ends of which are embraced by wire netting 2 fastened by tacks 3' to the members 1. This construction provides a casing having one open end, and permits required ventilation through the wire netting or screen wire 2.

Slidably and removably mounted in the open end of the casing is a U shaped resilient sheet metal member, preferably aluminum, 3, which is adapted to contain food, such as candy or honey comb 4. The said member 3 constitutes a food receptacle, which is adapted, when moved to the fully closed position shown in dotted lines in Fig. 2 to prevent access to the food 4 by insects at the exterior of the container. The closed end of the receptacle 3 also serves to fully close the open end of the casing, if no food is in the receptacle 3.

The arms of the U shaped receptacle are disposed so that they will respectively press against opposite inner sides of the casing, thus preventing the receptacle 3 from accidentally slipping out of the casing. The inward movement of the receptacle 3 is limited by a brad 5 extending through one of the members 1 into the path of the closed end of the receptacle 3.

In the operation of my invention, the insect, such as a queen bee is placed in the casing, after which the receptacle 3 containing the food 4 is slipped into the casing to the fully closed position, shown in dotted lines in Fig. 2, the food being soft enough for the brad 5 to cut easily through it.

The bee has access to the food 4 through the open end of the receptacle 3. When the bee is to be placed in a hive, the receptacle 3 is first pulled to the partly open position, shown in Fig. 1 and in solid lines in Fig. 2. The bees in the hive at the exterior of the container have access to the food 4 through the open sides of the receptacle 3.

After a while, before the food 4 has been entirely eaten by the queen bee and the exterior bees, the latter become accustomed to the presence of the queen, and, when the food has been eaten so as to release the queen, she is adopted into the colony by the bees as their queen, while if she had been released at first from the container, they might have killed her, as they often do other intruding bees.

I do not limit my invention to the structure shown and described, as modifications, within the scope of the appended claims, may be made without departing from the spirit of my invention.

What I claim is:—

1. An insect container comprising a casing having an opening, and a food receptacle slidable in said opening to and from a position closing said opening and having ingress means for an insect in said casing accessible to insects at the exterior of the casing when the receptacle is partly withdrawn from said opening and not accessible to insects at the exterior when the receptacle is in the closed position.

2. An insect container comprising a casing having an opening, and a U shaped food receptacle slidable in said opening to and from a position in which the closed end of the receptacle will close said opening.

3. An insect container comprising a casing consisting of two parallel longitudinal members and screen wire embracing opposite sides and one set of ends of said members, and a food receptacle slidable in said casing at the open end thereof to and from a position in which it will close said open end and having ingress means for an insect in said casing accessible to insects at the exterior of said casing when the receptacle is partly withdrawn from said opening and not accessible to exterior insects when the receptacle is in the closed position.

4. An insect container comprising a casing consisting of two parallel longitudinal members and screen wire embracing opposite sides and one set of ends of said members, and a U shaped food receptacle slidable in the open end of said casing to and from a position in which the closed end of said receptacle will close the open end of the casing.

5. An insect container comprising a casing having an open end, and a resilient U shaped food receptacle slidable in the open end of said casing to and from a position in which the closed end of said receptacle will close said opening, the arms of the receptacle respectively pressing against opposite inner sides of said casing.

6. An insect container comprising a casing having two parallel longitudinal members and screen wire embracing opposite sides and one set of ends of said members, and a resilient U shaped food receptacle slidable in the open end of said casing to and from a position in which the closed end of said receptacle will close the open end of said casing, the arms of said receptacle respectively pressing against opposite inner sides of the casing.

In testimony whereof I have signed my name to this specification.

JACOB F. DIEMER.